Dec. 25, 1945.  G. R. COMPTOIS  2,391,548
TOBACCO PIPE
Filed July 21, 1944
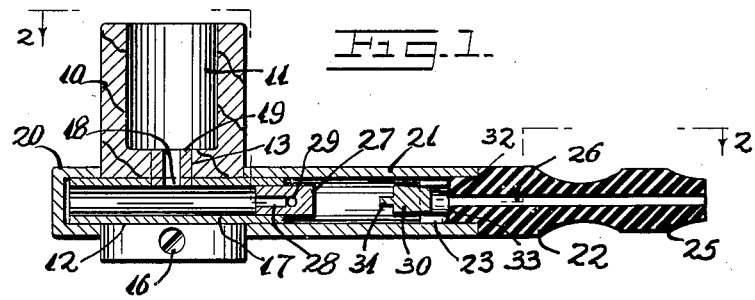
Fig. 1.
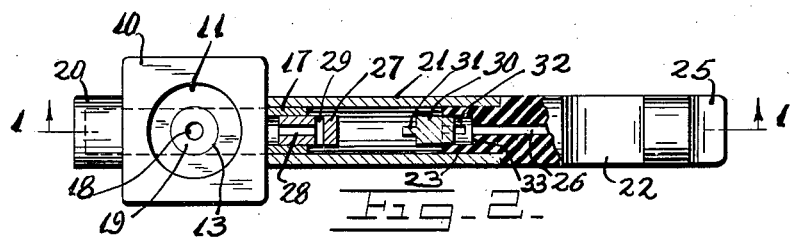
Fig. 2.
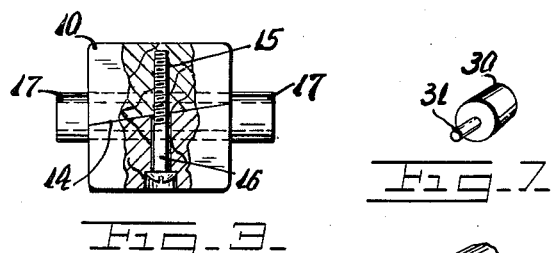
Fig. 3.
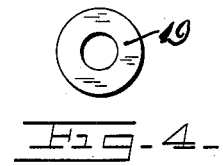
Fig. 7.
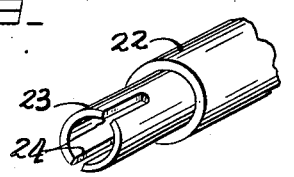
Fig. 6.
Fig. 4.
Fig. 5.
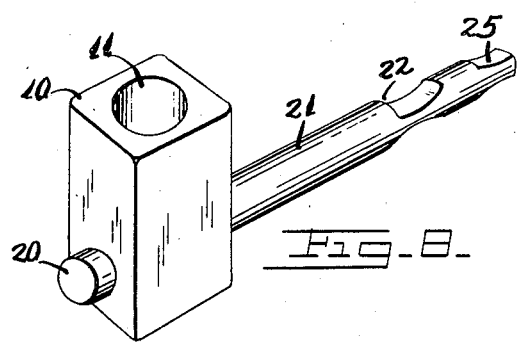
Fig. 8.
INVENTOR.
Gedeon R. Comptois
BY
ATTORNEY.

Patented Dec. 25, 1945

2,391,548

UNITED STATES PATENT OFFICE 2,391,548

TOBACCO PIPE

Gedeon R. Comptois, New York, N. Y.

Application July 21, 1944, Serial No. 545,951

3 Claims. (Cl. 131—211)

This invention relates to new and useful improvements in a tobacco pipe.

More specifically, the present invention proposes the construction of a tobacco pipe having a bowl, a stem member, and a barrel connecting the bowl and stem member.

A further object is to provide a pipe as aforesaid having a thimble connecting the barrel with the bowl.

Still another object of the invention is to provide a pipe as aforesaid in which the thimble is flavored.

Another object is to provide a stem member having a stem provided with a slotted end in which is adjustably disposed a fitting for regulating the draw of the pipe.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Fig. 1 is a section on the line 1—1 of Fig. 2, showing the pipe of the present invention.

Fig. 2 is a section on the line 2—2 of Fig. 1.

Fig. 3 is an inverted plan view of the pipe bowl and barrel, parts being shown in section.

Fig. 4 is an enlarged plan view of a thimble forming a part of the pipe of the present invention.

Fig. 5 is a side view of the thimble shown in Fig. 4.

Fig. 6 is an enlarged fragmentary perspective view of the stem of the pipe.

Fig. 7 is a perspective view of a fitting for the stem shown in Fig. 6.

Fig. 8 is a perspective view of the pipe.

The tobacco pipe, according to this invention, comprises a bowl 10, square in cross section. The bowl has a chamber 11 for tobacco, a longitudinal bore 12 below the chamber, a vertical bore 13 connecting the chamber and bore 12, an oblique split 14 in its lower face opening into the bore 12 and a bore 15 at right angles to and below bore 12 and extending across the split 14. Split 14 is made oblique so that, when the bowl is made of wood, the split will be inclined to the grain of the wood to prevent splitting. Bore 15 is closed at one end and is threaded at this end on one side of the split 14. The outer end of bore 15 is countersunk. A screw 16 is threaded in bore 15 and when tightened up, closes or substantially closes the split for a purpose presently to appear.

The head of the screw is housed in the countersunk outer end of bore 15.

A tubular barrel 17 is disposed in bore 12 and extends outwardly beyond either end thereof. Barrel 17 has an orifice 18 in line with bore 13 and a tubular thimble 19, best shown in Figs. 4 and 5, is disposed in bore 13 and orifice 18, securing the barrel in the pipe bowl against longitudinal movement relative thereto. After barrel 17 is placed in bore 12, screw 16 is tightened up so that the sides of bore 12 firmly clasp the barrel. Thimble 19 may be flavored to flavor the smoke, such as with rum, rum and honey, rum and maple, maple, honey or any other suitable well known flavoring for tobacco. The thimble 19 is flavored by soaking it in a substance which will give it the desired flavor.

One extending end of barrel 17 is closed by a removable cap 20. A stem member is mounted on the other end of the barrel. The stem member includes a tube 21 slidably disposed over the adjacent end of the barrel. A stem 22 is secured to the other end of the tube 21, the stem having a reduced end portion 23 disposed in the tube 21. The end portion 23 has opposed slots 24 which have as a function to insure a tight fit for the stem in the tube 21. The stem has the usual mouthpiece 25 and inner passage 26.

A fitting 27 is disposed in the end of barrel 17 disposed in tube 21. This fitting has a central bore 28 opening to the interior of the barrel and a bore 29 at right angles thereto connecting the bore 28 with the inside of the tube 21.

A plug or fitting 30 is disposed in the end portion 23 of the stem. This fitting is solid and has an extension forming a handle 31 projecting into the tube 21 providing means for moving the fitting in the end portion for adjustment. Fitting 30 has a cylindrical outer wall. It is adjustably disposed in the slotted end portion 23 so that a space 32, opening through both slots, is left between its end remote from the barrel 17 and the adjacent end wall 33 of the passage 26. This space, adjustable in size, forms an important feature of the present invention, as will presently appear.

The pipe as aforedescribed may be made of any suitable material such as is usually employed in the construction of pipes. For instance, the bowl may be made of briar or other wood, or of plastic, and the other parts may be made of plastic or hard rubber.

The operation of the pipe is as follows:

The user of the pipe puts tobacco in the chamber 11 and lights it with a match. He then draws the smoke through the stem into his mouth. The smoke will be flavored by the thimble 19 according to the flavor of the thimble. The thimble may be replaced when it has lost its flavor.

If the smoker finds that he is getting too much smoke, that is to say, that the pipe is drawing too freely, he can reduce the draw by moving the fitting 30 further into the stem 22 to reduce the size of the space 32. Conversely, if he is not getting enough smoke, he can increase the size of the space 32 by pulling the fitting 30 outwardly of the stem a certain amount. The slotted end portion is squeezed when pushed in the tube to firmly engage the tube and to firmly engage the fitting, thus insuring proper positioning of these parts.

The smoke from the tobacco passes through the thimble into the barrel and therefrom through the fitting 27 into the tube 21 and therefrom around the fitting 30 and through the space 32 into the passage 26. Any tar or other liquids from the tobacco smoke collects in barrel 17 and is prevented from entering the tube 21 in any substantial amounts by the fitting 27. However, such liquids as do enter the tube 21 are prevented from entering the stem 22 by the fitting 30. The fitting 30 also prevents saliva from the smoker's mouth from entering the tube. Thus the pipe insures a dry smoke with an adjustable draw.

It is a feature of the pipe that it is more easily cleaned than conventional pipes. Tube 21 and cap 20 can be pulled off of barrel 17 and fitting 27 removed from barrel 17, thereby exposing the interior of the barrel for cleaning. Similarly the tube 21 can be pulled from the stem 22 for cleaning. Both the barrel and the tube 21 have uninterrupted interior cylindrical surfaces rendering themselves to easy cleaning. The fitting 30 can be pulled from the stem for cleaning both of these members.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. A pipe for smoking tobacco comprising a bowl having a chamber for tobacco, a longitudinal bore below said chamber opening through opposite sides of said bowl, a vertical bore connecting said chamber and longitudinal bore, a split lengthwise of said longitudinal bore and extending through the bottom of said bowl, a screw hole extending through and across said split, a screw in said hole, a barrel in said longitudinal bore extending beyond said bowl at opposite sides thereof, said screw when tightened forcing the side walls of said longitudinal bore to grip said barrel, a removable cap covering one extending end of said barrel, a tube disposed over the other end of said barrel, a stem secured in the other end of said tube, and a fitting in said vertical bore securing said barrel to said bowl.

2. A pipe for smoking tobacco comprising a bowl having a chamber for tobacco, a longitudinal bore below said chamber opening through opposite sides of said bowl, a vertical bore connecting said chamber and longitudinal bore, a split lengthwise of said longitudinal bore and extending through the bottom of said bowl, a screw hole extending through and across said split, a screw in said hole, a barrel in said longitudinal bore extending beyond said bowl at opposite sides thereof, said screw when tightened forcing the side walls of said longitudinal bore to grip said barrel, a removable cap covering one extending end of said barrel, a tube disposed over the other end of said barrel, a stem secured in the other end of said tube, and a fitting in said vertical bore securing said barrel to said bowl, and a fitting disposed in the end of said barrel adjacent said tube, said fitting having a transverse bore and a longitudinal bore connecting said transverse bore with the interior of said barrel.

3. A pipe for smoking tobacco comprising a bowl having a chamber for tobacco, a longitudinal bore below said chamber opening through opposite sides of said bowl, a vertical bore connecting said chamber and longitudinal bore, an oblique split lengthwise of said longitudinal bore and extending through the bottom of said bowl, a screw hole extending through and across said split, a screw in said hole, a barrel in said longitudinal bore extending beyond said bowl at opposite sides thereof, said screw when tightened forcing the side walls of said longitudinal bore to grip said barrel, a removable cap covering one extending end of said barrel, a tube disposed over the other end of said barrel, a stem secured in the other end of said tube, and a fitting in said vertical bore securing said barrel to said bowl.

GEDEON R. COMPTOIS.